May 3, 1966     W. B. CARTER ET AL     3,249,648

SEPARATION OF OLEFINS FROM ALUMINUM ALKYLS

Filed March 26, 1962     4 Sheets-Sheet 2

INVENTORS
WILLIAM B. CARTER
JERRY A. ACCIARRI
BY
ATTORNEY

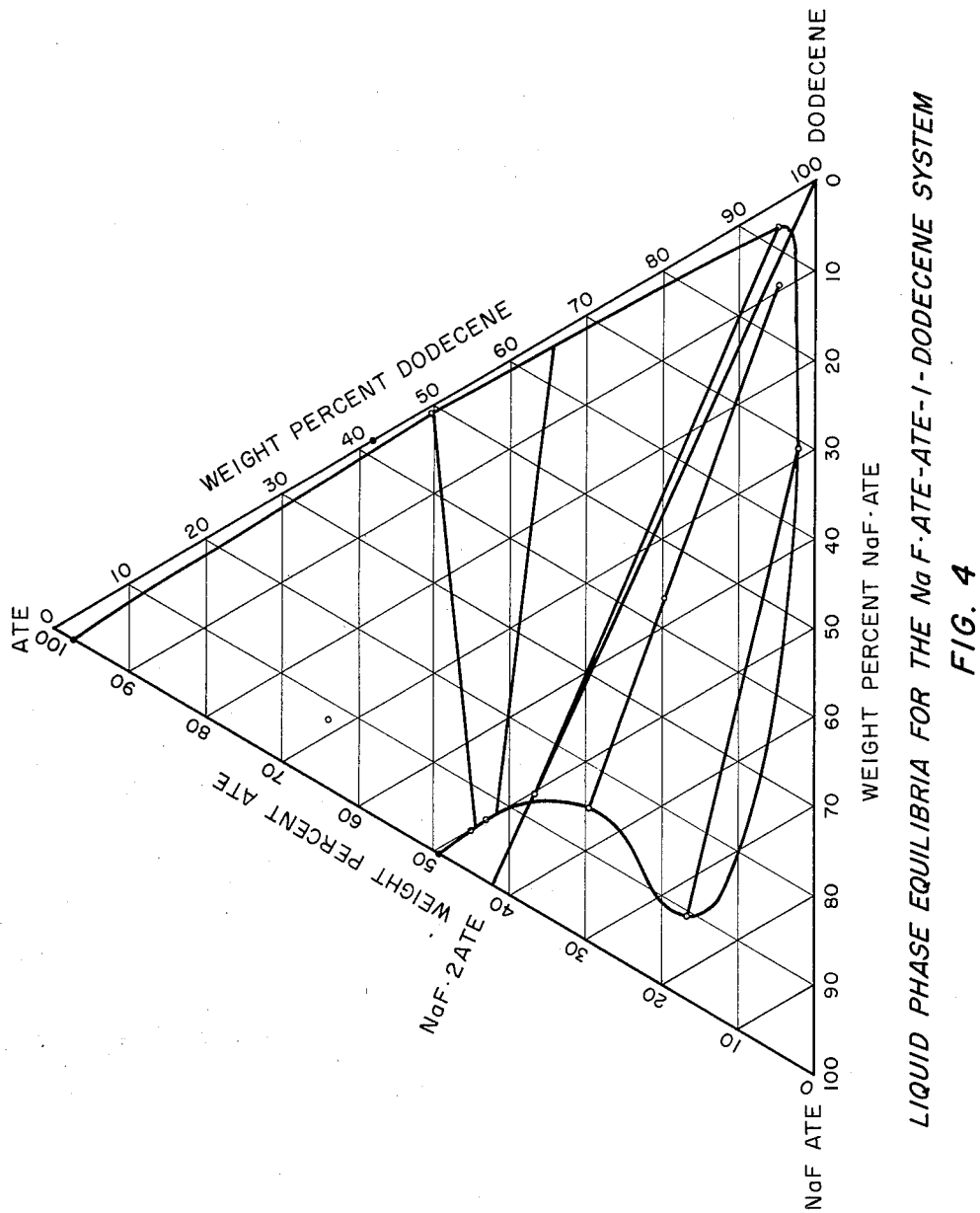

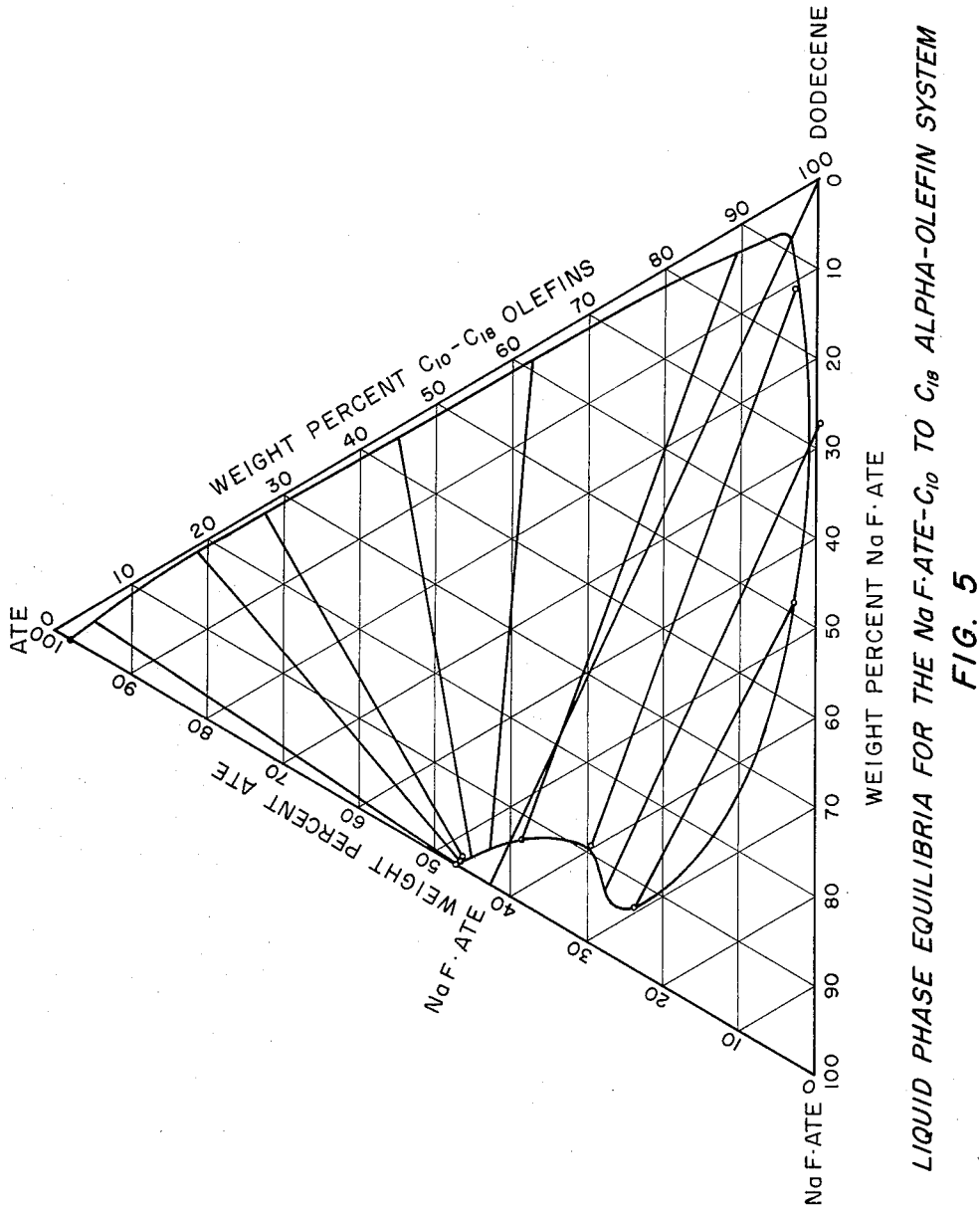

# United States Patent Office 3,249,648
Patented May 3, 1966

3,249,648
SEPARATION OF OLEFINS FROM ALUMINUM ALKYLS
William B. Carter, Ponca City, Okla., and Jerry A. Acciarri, Naples, Italy, assignors to Continental Oil Company, Ponca City, Okla., a corporation of Oklahoma
Filed Mar. 26, 1962, Ser. No. 182,229
3 Claims. (Cl. 260—683.15)

This invention relates to an improved process of separating aluminum trialkyl from a displacement product containing alpha-olefins.

The growth reaction involves the addition of a mono-olefin containing about 2 to 4 carbon atoms to an aluminum trialkyl in which the alkyl substituent contains about 2 to 4 carbon atoms and thus provides a high molecular weight trialkyl in which the alkyl substituents can contain from about 2 to 40 carbon atoms or higher. The growth product may be treated in a variety of ways to produce various products, namely, alcohol, alpha-olefin, etc. To produce alpha-olefins, the growth product is subjected to what is designated as a displacement reaction, which involves treating it with a mono-olefin containing 2 to 4 carbon atoms, with or without the presence of a catalyst, whereby the mono-olefin displaces the high molecular weight alkyl substituents in the aluminum compound. As a result of the displacement reaction, the reaction product contains a relatively low molecular weight aluminum trialkyl. The separation of alpha-olefins from the aluminum trialkyl presents problems, because the alpha-olefin may boil in the same range as the aluminum trialkyl and also where the separation is possible by distillation, adverse thermal effects may be encountered at the high temperatures employed for that purpose. In this regard, at the elevated temperatures, the alpha-olefins may undergo isomerization and/or reverse displacement reactions. As a consequence, various techniques have been investigated to determine the most practical manner in which alpha-olefins can be separated from aluminum trialkyl without suffering the disadvantages mentioned above.

Therefore, an object of this invention is to provide an improved method of separating alpha-olefins from aluminum trialkyl which avoids the adverse thermal effects encountered at elevated temperatures.

Another object of this invention is to provide a method of treating a displacement product containing alpha-olefins and low molecular weight aluminum trialkyl, whereby the adverse thermal effects encountered by the distillation technique are avoided substantially.

Other objects and advantages of this invention will become apparent from the following explanation and description thereof.

In accordance with the present invention, a mixture including a low molecular weight aluminum trialkyl, such as, for example, an aluminum trialkyl having alkyl substituents containing about 2 to 4 carbon atoms and high molecular weight alpha-olefins, the alpha-olefins including at least one olefin which is difficultly separable from said aluminum trialkyl by distillation and additional olefins, all of which are higher boiling than the aforementioned olefin, is extracted with a complex of an alkali metal fluoride and an aluminum trialkyl in which the alkyl substituents contain about 2 to 4 carbon atoms to produce a raffinate containing a substantial amount of the alpha-olefins and an extract containing the complex and aluminum trialkyl, the extract is pyrolyzed to decompose at least part of the complex, uncombined aluminum trialkyl is separated from the pyrolyzed extract and the complex is reused for the extraction of aluminum trialkyl from the mixture containing the same.

In one aspect, the invention relates to the treatment of a mixture which is obtained by reacting a low molecular weight trialkyl, with a low molecular weight mono-olefin to produce a growth product, including a high molecular weight aluminum trialkyl, displacing the high molecular weight alkyl substituents with relatively low molecular weight alkyl substituents to produce a displacement product, including high molecular weight alpha-olefins and low molecular weight aluminum trialkyl, distilling the displacement product to provide a mixture containing the low molecular weight aluminum trialkyl and at least one olefin which is difficulty separable from said aluminum trialkyl and additional olefins, all of which are higher boiling than the aforementioned olefin and then carrying out the procedure as set forth in the preceding paragraph.

In still another aspect of the invention, the mixture of low molecular weight aluminum trialkyl and alpha-olefins is further subjected to distillation to remove the olefins boiling higher than the olefin which is difficulty separable from said aluminum trialkyl.

The starting material for the displacement product is obtained by the well-known growth reaction in which a low molecular weight mono-olefin, such as, ethylene, propylene, butene, etc., is combined with a low molecular weight aluminum trialkyl, such as, for example, an aluminum trialkyl having the alkyl substituents containing from about 2 to 24 carbon atoms. The resultant growth product comprises a trialkyl compound in which the alkyl groups vary widely in molecular weight. The growth reaction can be illustrated by the following equation:

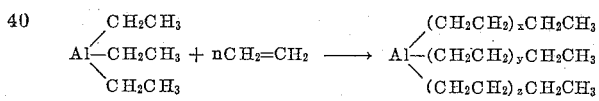

wherein $x$, $y$ and $z$ represent integers ranging from 0 to about 14 and $x+y+z$ is equal to small $n$. The growth reaction is carried out by passing the mono-olefin such as ethylene through trialkylaluminum, such as, triethylaluminum, preferably in the presence of a diluent under a variety of reaction conditions. The temperature of reaction is from about 65° to 150° C. and at a pressure of about 200 to 5,000 p.s.i.g., and more usually, a temperature of about 90° to 120° C., and at a pressure of about 1,000 to 3,500 p.s.i.g.

The growth reaction provides a statistical distribution of alkyl chain lengths characterized by the Poisson relationship, which can be expressed as follows:

$$P_{(n)} = \frac{m^n e^{-m}}{n!}$$

wherein $P_{(n)}$ represents the probability that a certain hydrocarbon radical will be formed by "$n$" additions of ethylene to the aluminum ethyl bond originally present and $m$ is the mean number of additions of ethylene per growing chain. The following table contains an illustration of a type of distribution which is obtained in the growth reaction:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction is ordinarily carried out in a diluent which can be a paraffin, cycloparaffin or aromatic hydrocarbon, such as, for example, isooctane cyclohexane, benzene, xylene, and the like. The diluent aids in controlling the temperature of the reaction which is exothermic and also serves as a solvent for the growth product.

The growth product has alkyl substituents containing about 2 to 40 carbon atoms or higher. It is subjected to a displacement reaction with a low molecular weight mono-olefin containing about 2 to 4 carbon atoms. The low molecular mono-olefin may be, for example, ethylene, propylene or butene. In the displacement reaction the mono-olefin is substituted for the high molecular weight alkyl substituents of the aluminum compound. As a consequence, the displacement reaction comprises a low molecular weight trialkyl in which the alkyl substituents contain about 2 to 4 carbon atoms and alpha-olefins containing about 2 to 40 carbon atoms or higher. When ethylene is used as the mono-olefin in the displacement reaction and the alpha-olefin comprises a mixture of olefins containing from about 2 to 30 carbon atoms, and principally from about 10 to 18 carbon atoms, it is found that it is difficult to separate aluminum triethyl from 1-dodecene because of the closeness in boiling point between the two compounds. Consequently, where the aluminum trialkyl compound is close in boiling point to the alpha-olefin, separation by distillation presents difficult problems which is not practical from an economical standpoint. As might be expected, aluminum tripropyl or tributyl will boil closely to alpha-olefins of higher molecular weight than dodecene, and accordingly the same type of problem is encountered when these compounds are employed.

The displacement reaction between the low molecular weight mono-olefin and the high molecular weight trialkyl is conducted at a temperature of about 50° to 350° C., more usually about 50° to 150° C., and at a pressure of about 2 to 100 atmospheres, more usually about 10 to 40 atmospheres. The reaction can be conducted thermally or catalytically, and in this respect no difference is noted in the method of separation of the present invention. In the reaction, the quantity of low molecular weight mono-olefin is governed to effect the complete replacement of the alkyl substituents in the aluminum compounds. For this purpose, generally, a stoichiometric amount of the low molecular weight mono-olefin is employed; however more usually a stoichiometric excess of about 10 to 1,000 mole percent of low molecular weight mono-olefin per mole of growth product is employed. The displacement reaction takes place over a period of 0.01 to 30 minutes, more usually about 1 to 20 minutes; and it can also occur in the presence of a conventional or a displacement catalyst. Such catalysts are well-known to those skilled in the art and include nickel, cobalt, palladium and certain iron compounds. Specific examples of catalysts are finely divided metallic nickel, Raney nickel, nickel acetylacetonate, nickel naphthanate. The amount of catalyst employed for the reaction may vary greatly, but usually about 0.001 to 0.1 percent, based on the weight of growth product, can be employed.

The separation of the low molecular weight aluminum trialkyl from the displacement product is effected by the use of a complex of an alkali metal fluoride and aluminum trialkyl as the extraction agent. The alkali metal fluoride can be, for example, sodium fluoride, potassium fluoride, etc., and the aluminum trialkyl can be aluminum triethyl, aluminum tripropyl, aluminum tributyl, etc. The complex can contain from 1 to 2 moles of aluminum trialkyl containing, for example, about 2 to 4 carbon atoms per alkyl substituent per mole of alkali metal fluoride. The complex has been found to be soluble in lower molecular weight alpha-olefins; therefore it is necessary before using the complex to process the displacement product, usually by distillation, to remove the lower boiling alpha-olefins which are separable from the aluminum trialkyl by distillation. In the case of aluminum triethyl, all of the lower molecular weight alpha-olefins up to and including those containing 8 carbon atoms are separable from the aluminum triethyl and are successfully removed by distillation.

By contacting the complex with the distilled displacement reaction product, the aluminum trialkyl present in the reaction mixture complexes with the extraction agent and/or is dissolved therein, leaving behind a raffinate of substantially reduced content of aluminum trialkyl. The raffinate is comprised substantially of alpha-olefin, because it has a very low solubility and affinity for the complex. The extraction of displacement product with the complex is conducted at a temperature of about 10° to 150° C., more usually about 30° to 100° C. The extraction may be conducted at atmospheric, subatmospheric or superatmospheric pressures. About 0.4 to 0.7 part by weight of displacement reaction product, more usually about 0.5 to 0.6 part by weight per unit volume of the complexing agent are employed. The extraction process can be conducted as a cocurrent or countercurrent operation in a suitable vessel such as an elongated column containing packing and the like to effect intimate conduct between the displacement product and the extraction agent. In the simplest kind of operation, the extraction agent and displacement product are mixed in a vessel and permitted to separate into two layers for subsequent separation. This operation simulates a single stage of extraction and may be adequate in some instances, depending upon the degree of separation desired.

The extraction of displacement product with the complex of alkali metal fluoride and aluminum trialkyl may also be accompanied by stripping of the extract phase through temperature control or recycle of aluminum triethyl to remove further any raffinate or alpha-olefin contained therein. Stripping with the aluminum trialkyl can be conducted at a temperature of about 0 to 150° F. and at a pressure which can be atmospheric, superatmospheric or subatmospheric. The quantity of stripping agent such as aluminum trialkyl employed relative to the extract varies, on a volumetric basis, from about 1 to 10 parts per unit part of the former to the latter. The residence time of stripping is from about 1 to 30 minutes.

The complex enriched with aluminum trialkyl is pyrolyzed to recover the aluminum trialkyl which was extracted during the extraction operation. The pyrolysis can occur at a temperature of about 200 to 300° F., and at a pressure of about 1 to 100 mm. Hg. The time of pyrolysis can vary appreciably, but in general about 0.1 to 2 minutes may be involved. As a result of the heat treatment, the aluminum trialkyl is recovered as a separate phase from the pyrolysis zone.

While the invention is preferably carried out by treating a mixture of alpha-olefins containing higher molecular weight alpha-olefins present with the olefin which is difficultly separable from the aluminum trialkyl, it is also within the scope of the invention to subject the displacement product to two distillation steps, whereby substantially all of the alpha-olefins are removed except the single olefin which cannot readily be separated from the aluminum trialkyl by distillation. In the case of aluminum triethyl, this olefin is 1-dodecene, which can be separated from aluminum triethyl by following the general procedures described hereinbefore.

To provide a fuller understanding of the present invention, reference will be had to the accompanying drawings which contain specific illustrations of the extraction process and form a part of this invention.

FIGURE 4 is a phase equilibrium diagram for the system sodium fluoride-aluminum triethyl complex; aluminum triethyl and 1-dodecene; and FIGURE 5 is a phase equilibrium diagram for the system sodium fluoride-aluminum triethyl complex; aluminum triethyl and $C_{10}$ to $C_{18}$ alpha-olefins.

Figure 1:
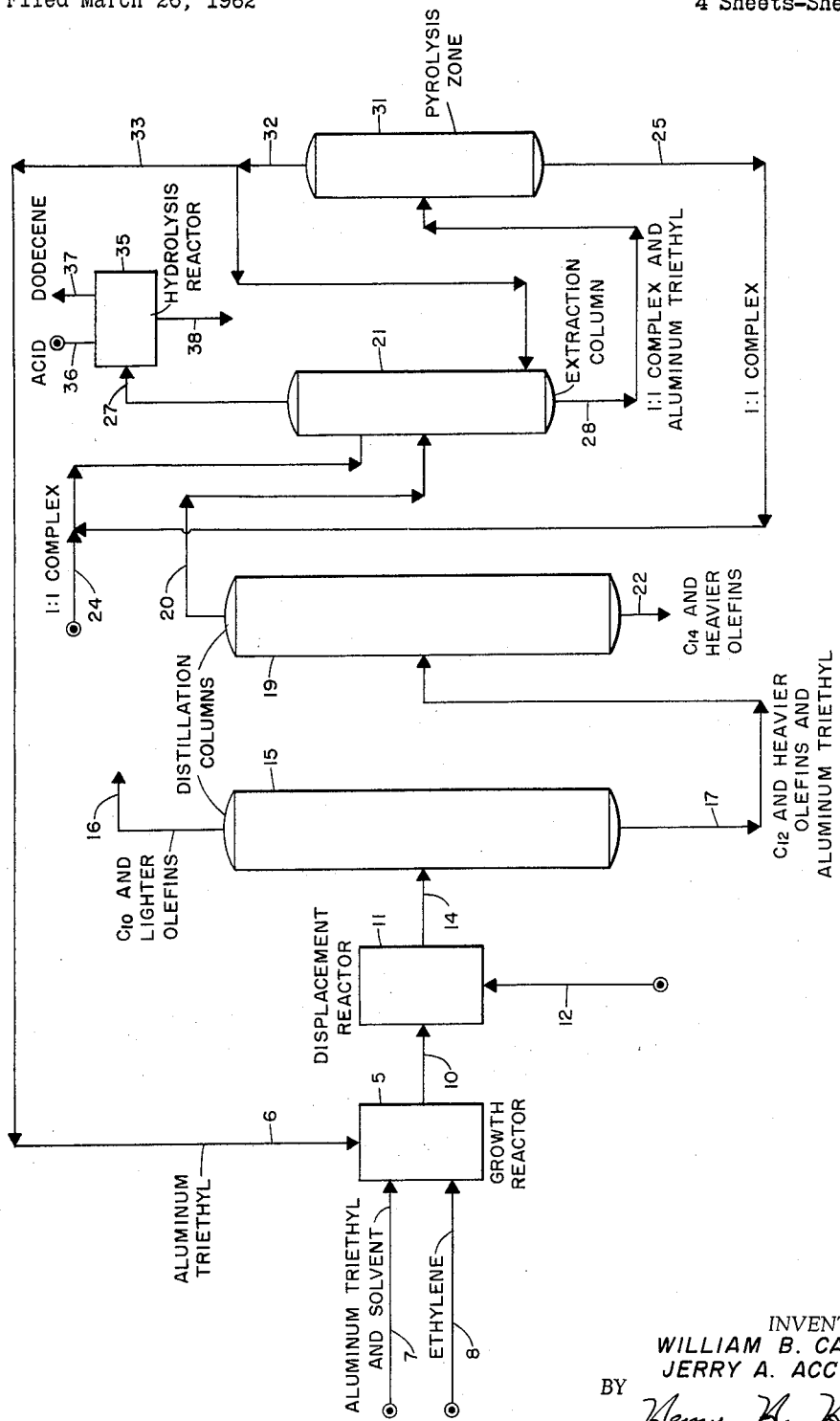
FIGURE 1 illustrates a system for separating aluminum triethyl from 1-dodecene in which two preliminary distillations of the displacement product are employed to separate olefins below and above 1-dodecene.

In FIGURE 1, recycle aluminum triethyl and fresh or make-up aluminum triethyl in 1,800 pounds of solvent are fed to the growth reactor 5 from recycle line 6 and supply source line 7, respectively. Additionally, ethylene is fed to the growth reactor 5 via line 8. These materials are retained in the growth reactor at an elevated temperature for a period of time sufficient to effect the growth reaction. Thereafter, the growth product, which is grown to a Poisson distribution of 4.0, flows from line 10 to reactor 11. Ethylene is also fed to the displacement reactor 11 via line 12. In the displacement reactor, the growth product and ethylene are contacted in the presence of a nickel catalyst, whereby olefins are displaced from the growth product. The reaction mixture is passed from the displacement reactor 11 through line 14 to distillation column 14. This mixture comprises displaced olefins, aluminum triethyl and solvent.

In the distillation column 15, the displacement product is subjected to fractionation treatment for the production of an overhead product in line 16 containing alpha-olefins having not more than 10 carbon atoms per molecule.

The bottoms product in line 17 is fed to a second distillation column 19 for further treatment. In distillation column 19, an overhead product containing 1-dodecene and aluminum triethyl and a bottoms product containing alpha-olefins having more than 10 carbon atoms per molecule is produced. The overhead product containing 1-dodecene and aluminum triethyl leaves column 19 via line 20 and is passed to the middle part of an extraction column 2. The bottoms product of the distillation column 19 is yielded from the system through line 22.

For the extraction operation, make-up 1:1 complex of sodium fluoride and aluminum triethyl is supplied to the column 21 through line 24. A 1:1 complex present in line 25 joins with the make-up complex stream, and the combined streams flow through line 26 and thence enter the top of the extractor 21. The raffinate produced in the extraction column 21 is yielded overhead through line 27, and the extract is discharged from the bottom of the column 21 through line 28. Aluminum triethyl is recycled to the bottom of extractor 21 through line 29. The introduction of aluminum triethyl into the bottom of the extraction column serves to strip from the extract any raffinate material which may be included therein. The raffinate is yielded from the top of the extractor 21 through line 27. Complex, enriched with a substantial amount of aluminum triethyl, is discharged from the bottom of the extractor 21 through line 28.

The enriched extract in line 28 is fed to a pyrolysis zone 31. In the pyrolysis zone 31, the temperature is maintained at an elevated temperature in order that the aluminum triethyl in the complex which corresponds to the amount by which the complex is enriched can be recovered as a separate phase and thus can be discharged through an overhead line 32. The pyrolyzed complex is discharged from the bottom of the pyrolysis column 31 through line 25 and is recycled as previously described. The overhead product from the pyrolysis column 31 is divided so that a portion is recycled to the extraction column 21 through line 29 and the remainder is recycled to the growth reactor 5 through line 18 as previously indicated.

The raffinate product in line 27 is fed to a hydrolysis reactor 35 in which it is treated with a 10 percent aqueous solution of sulfuric acid to hydrolyze the aluminum triethyl and 1:2 complex contained therein. The acid solution is fed to the hydrolysis reactor 35 through a supply line 36. The raffinate substantially free of aluminum triethyl and complex is discharged from the hydrolysis reactor 35 through line 37. The remaining product of the hydrolysis reaction, which is an aqueous phase, is discharged from the bottom thereof through line 38.

Figure 2:
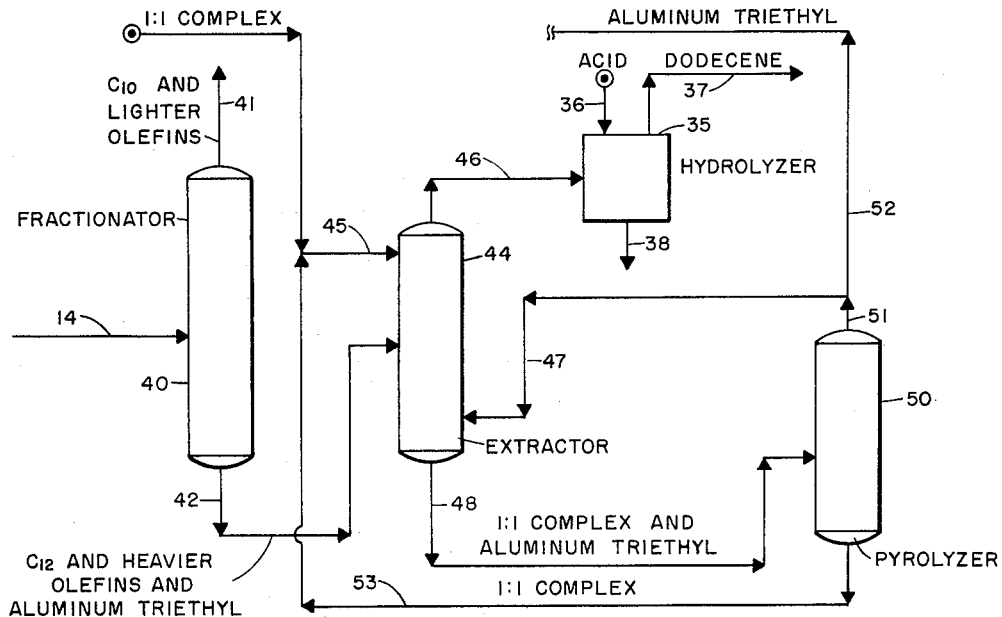
FIGURE 2 illustrates a system in which a single preliminary distillation step of the displacement product is employed to remove olefins below 1-dodecene before the extraction treatment.

In FIGURE 2, the displacement product in line 14 may be alternatively fed into a first fractionator 40. An overhead fraction containing 1-dodecene and lighter alpha-olefins is discharged from the column through line 41; and a bottoms product containing 1-dodecene and heavier compounds, including aluminum triethyl, is discharged via line 42. Instead of passing the bottoms product to a second fractionator as in FIGURE 1, it is fed to the middle of an extractor 44 wherein a 1:1 complex of sodium fluoride and aluminum triethyl is fed to the top part thereof through a line 45. As a result of countercurrent exchange between the just-mentioned feed streams, a raffinate is yielded overhead comprising alpha-olefins and some aluminum triethyl and a 1:2 complex through line 46. The extract produced in the extractor 44 flows within the lower part thereof where it is stripped with aluminum triethyl to remove raffinate material therefrom. The aluminum triethyl used as stripping agent is fed to the bottom part of the extractor 44 via line 47. The extract leaves the extractor 44 through line 48. The extract is fed to a pyrolyzer 50 wherein it is heated to an elevated temperature. The heat treatment causes aluminum triethyl to separate from the extract; and, since it is lighter in density, it rises and is yielded overhead through line 51. Part of the aluminum triethyl is recycled to the extractor 44 through line 47, whereas the remainder is fed back to the growth reactor (not shown) by means of line 52.

The overhead product of the extractor 44 is fed to a hydrolyzer 35 and treated in the same way as explained in connection with FIGURE 1; hence no further explanation is required.

Figure 3:
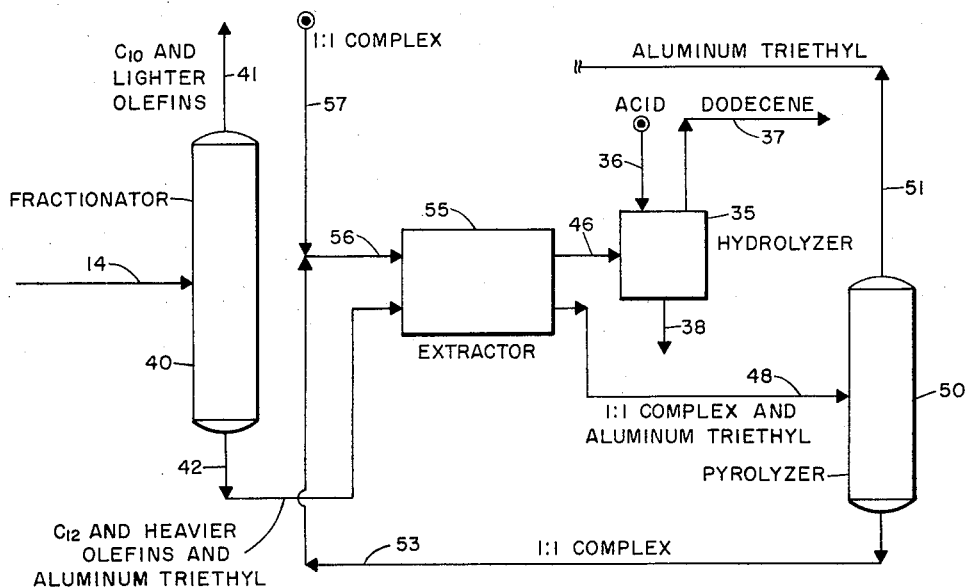
FIGURE 3 illustrates a single stage extraction of the distilled displacement product employed in the process of FIGURE 2.

In FIGURE 3 the displacement product enters the fractionator 40 wherein the same separation as in FIGURE 2 is effected. However, in FIGURE 3, the bottoms product of the fractionator flows from line 42 into a single stage extractor 55 wherein it is contacted with a 1:1 complex for the removal of aluminum triethyl. The complex is fed to the extractor 55 by means of line 56 which is actually a combined stream of fresh complex coming from a supply source 57 and recycle complex from line 53. The raffinate and extract from the extractor 55 are treated in the same way as in Example 2; hence no further explanation appears necessary, and the same materials are employed in both figures. It is to be noted that in FIGURE 3 no aluminum triethyl is recycled to the extractor 55.

FIGURES 4 and 5 provide a comparison between the phase equilibria which exist in the two systems present in the extraction step of FIGURES 1 and 2, respectively. The improved solubility characteristics provided by having the higher molecular weight olefins present with the 1-dodecene (FIGURE 5) are apparent from the phase equilibria diagrams.

The following examples are presented in illustration of various applications of the invention on a commercial scale. As used in the examples, the term 1:1 complex means a complex containing 1 mole of alkali metal fluoride and 1 mole of aluminum trialkyl; and 1:2 complex means a complex containing 1 mole of alkali fluoride and 2 moles of aluminum trialkyl.

*Example 1*

Flows—

| | Pounds |
|---|---|
| Feed to growth reactor 5: | |
| Aluminum triethyl 6 and 7 | 1,750 |
| Solvent 7 | 1,800 |
| Ethylene 8 | 5,200 |
| Feed to displacement reactor 11: | |
| Growth product 10 (M=4.0) | 6,950 |
| Solvent 10 | 1,800 |
| Ethylene 12 | 1,300 |
| Feed to distillation column 15: | |
| Olefins 14 | 6,500 |
| Aluminum triethyl 14 | 1,750 |
| Solvent 14 | 1,800 |
| Feed to distillation column 19: | |
| Olefins ($C_{12}$ and heavier) 17 | 3,400 |
| Aluminum triethyl 17 | 1,750 |
| Feed to extraction column 21: | |
| 1-dodecene-aluminum triethyl fraction 20 | 3,000 |
| 1:1 complex 24 and 25 | 1,900 |
| Feed to pyrolysis zone 31: | |
| 1-dodecene 28 | 140 |
| Aluminum triethyl | 1,700 |
| 1:1 complex 28 | 1,900 |
| Products from pyrolysis zone 31: | |
| 1-dodecene 33 | 140 |
| Aluminum triethyl 33 | 1,700 |
| 1:1 complex 25 | 1,900 |
| Feed to hydrolysis reactor 35: | |
| 1-dodecene 27 | 1,100 |
| 1:2 complex 27 | 80 |
| Aqueous sulfuric acid (25%) 36 | 77 |

Temperatures:

| | °F. |
|---|---|
| Growth reactor 5 | 248 |
| Displacement reactor 11 | 225 |
| Distillation column 15: | |
| Top | 130 |
| Bottom | 200 |
| Distillation column 19: | |
| Top | 200 |
| Bottom | 280 |
| Extraction column 21 | 160 |
| Pyrolysis zone 31 | 250 |
| Hydrolysis reactor 35 | 180 |

Pressures:

| | P.s.i.g. |
|---|---|
| Growth reactor 5 | 1,500 |
| Displacement reactor 11 | 500 |
| Distillation column 15, mm., Hg | 10 |
| Distillation column 19, mm., Hg | 10 |
| Extraction column 21 | 0 |
| Pyrolysis zone 31, mm., Hg | 20 |
| Hydrolysis reactor 35 | 50 |

*Example 1(a)*

Flows—

| | Pounds |
|---|---|
| Feed to extraction column 21: | |
| 1-dodecene-aluminum triethyl fraction 20 | 3,000 |
| 1:1 complex 24 | 1,900 |
| Aluminum triethyl 29 | 1,900 |

*Example 1(a)—Continued*

| | |
|---|---|
| Feed to pyrolysis zone 31: | |
| 1-dodecene 28 | 76 |
| 1:1 complex 28 | 1,900 |
| Aluminum triethyl 28 | 1,820 |
| Products from pyrolysis zone 31: | |
| 1-dodecene 33 | 76 |
| Aluminum triethyl 33 | 1,820 |
| 1:1 complex 25 | 1,900 |
| Feed to hydrolysis reactor 35: | |
| 1-dodecene 27 | 2,830 |
| 1:2 complex 27 | 174 |
| Aqueous sulfuric acid 36 (25%) | 504 |

*Example 2*

Flows—

| | Pounds |
|---|---|
| Feed to fractionator 40: | |
| Olefins 14 | 6,500 |
| Aluminum triethyl 14 | 1,750 |
| Solvent 14 | 1,800 |
| Feed to extractor 44: | |
| Aluminum triethyl 42 | 1,750 |
| Dodecene and heavier olefins 42 | 3,400 |
| 1:1 complex 45 and 53 | 2,300 |
| Feed to pyrolyzer 50: | |
| Olefins 48 | 170 |
| Aluminum triethyl 4B | 1,650 |
| 1:1 complex 48 | 2,200 |
| Products from pyrolyzer 50 | |
| Aluminum triethyl 51 | 1,650 |
| 1:1 complex 53 | 2,200 |
| Olefins 51 and 53 | 170 |
| Feed to hydrolyzer 35: | |
| Olefins 46 | 3,250 |
| 1:2 complex 46 | 250 |
| Aqueous sulfuric acid 36 (25%) | 850 |

Temperatures—

| | °F. |
|---|---|
| Fractionator 40: | |
| Top | 130 |
| Bottom | 200 |
| Extractor 44 | 160 |
| Pyrolyzer 50 | 250 |
| Hydrolyzer 35 | 180 |

Pressures:

| | P.s.i.g. |
|---|---|
| Fractionator 40, mm. Hg | 10 |
| Extractor 44 | 0 |
| Pyrolyzer 50, mm. Hg | 20 |
| Hydrolyzer 35 | 50 |

*Example 3*

Flows—

| | Pounds |
|---|---|
| Feed to fractionator 40: | |
| Olefins 14 | 6,500 |
| Aluminum triethyl 14 | 1,750 |
| Solvent 14 | 1,800 |
| Feed to extractor 55: | |
| Aluminum triethyl 42 | 1,750 |
| Dodecene and heavier olefins 42 | 3,400 |
| 1:1 complex 57 and 58 | 2,800 |
| Feed to pyrolyzer 50: | |
| Olefins 48 | 420 |
| Aluminum triethyl 48 | 1,650 |
| 1:1 complex 48 | 2,700 |
| Products from pyrolyzer 50: | |
| Aluminum triethyl 51 | 1,650 |
| 1:1 complex 53 | 2,700 |
| Olefins 51 and 53 | 420 |
| Feed to hydrolyzer 35: | |
| Olefins 46 | 3,000 |
| 1:2 complex 46 | 225 |
| Aqueous sulfuric acid 36 (25%) | 760 |

Example 3—Continued

Temperatures—
Fractionator 40: °F.
    Top _____ 130
    Bottom _____ 200
Extractor 44 _____ 160
Pyrolyzer 50 _____ 250
Hydrolyzer 35 _____ 180

Pressures: P.s.i.g.
    Fractionator 40, mm. Hg _____ 10
    Extractor 44 _____ 0
    Pyrolyzer 50, mm. Hg _____ 20
    Hydrolyzer 35 _____ 50

Example 4

Sodium fluoride (16.0 grams, 0.38 mole) was added to displacement product (200 ml., 150.7 grams) with heating and stirring for one hour. All the NaF dissolved, but no second layer formed even on cooling in an ice-isopropanol bath. Approximately 200 ml. of n-pentane was added and again no phase split was noted, even with cooling to 0° C.

This example illustrates the solubility of the sodium fluoride-aluminum triethyl complex in the *total* displacement product.

Example 5

Displacement product (292 grams) was vacuum stripped at 3 mm. and a pot temperature of 82° C. The system now consisted of three cuts:

Grams
Bottoms _____ 96.9
Distillate _____ 134.0
Trap liquid _____ 57.8

Gas was not evolved on hydrolyzing the distillate showing that no aluminum triethyl was vaporized. (The bottoms contained substantially all of the 1-octene and the 1-decene.)

The calculated quantity of $NaF \cdot Al(C_2H_5)_3$ (72.9 grams, 0.467 mole) was added to the bottoms and the mixture heated with stirring to 130° C. The 1:1 complex dissolved and, on cooling, no layers separated.

This example illustrates that separation of aluminum triethyl from dodecene is not possible, even though all of the lower boiling olefins other than octene are removed from the displacement product.

Example 6

Molten $NaF \cdot Al(C_2H_5)_3$ (32.8 grams, 0.21 mole) was added to a mixture of $AlEt_3$ (22.3 grams, 0.196 mole) and dodecene-1 (100 grams) at 130° C. with stirring. The mixture was heated to 130° C. for one hour and allowed to cool. Two liquid layers resulted:

Grams
Upper dodecene layer _____ 101.3
Lower complex layer _____ 46.8

The layers were analyzed for sodium and aluminum. The following analysis was obtained:

| | Percent Na | Percent Al | Na/Al |
|---|---|---|---|
| Dodecene layer | 0.65 | 2.51 | 0.259 |
| Complex layer | 7.27 | 15.99 | 0.455 |
| 1:1 Complex (theoretical) | 14.70 | 17.30 | 0.850 |
| 1:2 Complex (theoretical) | 8.52 | 20.00 | 0.426 |

This example illustrates that separation is readily attained when the mixture of dodecene and aluminum triethyl is extracted with sodium fluoride.

Having thus described the invention by providing specific examples thereof, it is to be understood that no undue limitations or restrictions are to be drawn by reason thereof and that many variations and modifications are within the scope of the invention.

We claim:

1. A process which comprises reacting aluminum triethyl with ethylene to produce a growth product including a high molecular weight aluminum trialkyl, displacing the high molecular weight alkyl substituents with ethylene to produce a displacement product including high molecular weight alpha-olefins and aluminum triethyl, distilling the displacement product to remove olefins containing less than 10 carbon atoms to provide a product containing aluminum triethyl and a mixture containing alpha-olefins having 10 carbon atoms and heavier olefins, extracting the aluminum triethyl from the distilled displacement product by means of a complex of aluminum triethyl and sodium fluoride to produce a raffinate of alpha-olefin and an extract of complex enriched with aluminum triethyl, heating the extract to separate therefrom the aluminum triethyl and thereby denuding the complex, and reusing the denuded complex for extraction of displacement product.

2. The process of claim 1 wherein the extraction step is a single stage operation.

3. The process of claim 1 wherein part of the separated aluminum triethyl is employed for stripping the extract of any raffinate material which may be present therein.

References Cited by the Examiner

UNITED STATES PATENTS 2,844,615   7/1958   Ziegler et al. _____ 260—448
2,906,794   8/1959   Aldridge et al. _____ 260—683.15

OTHER REFERENCES

Duck, Thesis published July 27, 1956, at the Technische Hashschule of Aachen, Germany.

Liebigs, "Annalen der Chemie" Band 629, March 1960, pages 180, 181, 194 and 195 relied on.

PAUL M. COUGHLAN, *Primary Examiner.*

ALPHONSO D. SULLIVAN, *Examiner.*